United States Patent [19]
Wallis

[11] 3,978,827
[45] Sept. 7, 1976

[54] PISTON ENGINE EMPLOYING OXYGEN

[76] Inventor: Marvin E. Wallis, 3755 San Remo Drive, Santa Barbara, Calif. 93105

[22] Filed: June 23, 1975

[21] Appl. No.: 589,502

Related U.S. Application Data

[62] Division of Ser. No. 408,368, Oct. 23, 1973, Pat. No. 3,905,339.

[52] U.S. Cl............................ 123/46 R; 123/32 AE
[51] Int. Cl.² .................... F02B 71/00; F02D 31/10
[58] Field of Search.............. 123/65 B, 65 BA, 1 A, 123/32 AE, 46 R, 46 SL

[56] References Cited
UNITED STATES PATENTS

| | | | |
|---|---|---|---|
| 2,887,993 | 5/1959 | Shallenberg | 123/65 BA |
| 3,269,321 | 8/1966 | Eickmann | 123/46 R |
| 3,608,529 | 9/1971 | Smith et al | 123/1 A |
| 3,680,305 | 8/1972 | Miller | 123/65 BA |
| 3,877,450 | 4/1975 | Meeks | 123/1 A |

Primary Examiner—Wendell E. Burns
Assistant Examiner—James W. Cranson, Jr.
Attorney, Agent, or Firm—Nilsson, Robbins, Dalgarn & Berliner

[57] ABSTRACT

A piston engine employing a flywheel rotor, in lieu of a crankshaft, driven hydraulically by the piston. One end of a plunger is connected to the piston, the other end being slidably disposed in an hydraulic cylinder. In the combustion mode, fuel and oxygen are injected and spark ignited, both by the same variable speed D.C. speed control motor. The piston-driven plunger displaces hydraulic fluid in the cylinder through a high speed orifice to impinge against spaced cavity surfaces formed along the periphery of the flywheel rotor, thereby spinning the rotor. A slide valve is disposed in the orifice and is hydraulically connected to the cylinder so that pressure changes in the cylinder reciprocate the slide valve to provide momentary delay, during pressure build-up, and then release of the cylinder fluid, thereby increasing the fluid velocity. Hydraulic fluid is recirculated during an exhaust stroke wherein the piston is returned by injected air pressure.

2 Claims, 6 Drawing Figures

U.S. Patent  Sept. 7, 1976  3,978,827
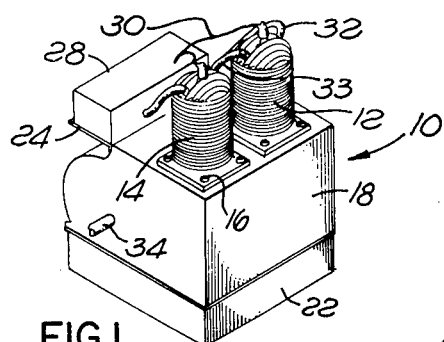
FIG.1.
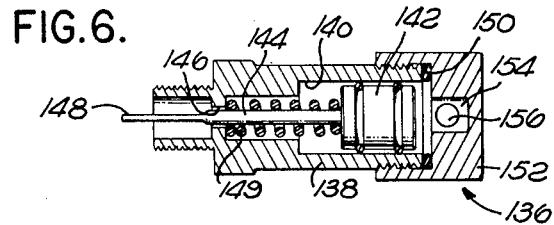
FIG.6.
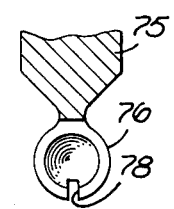
FIG.3.
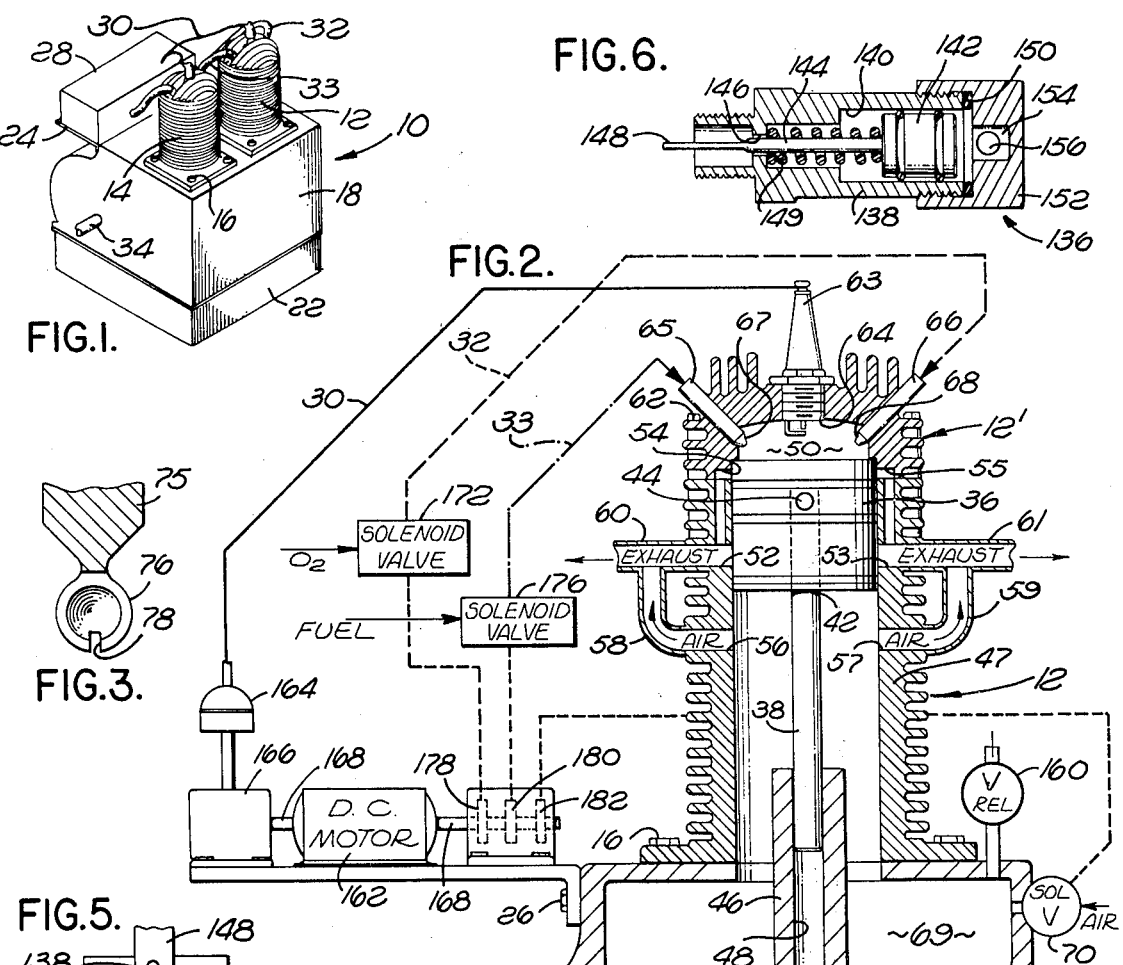
FIG.2.
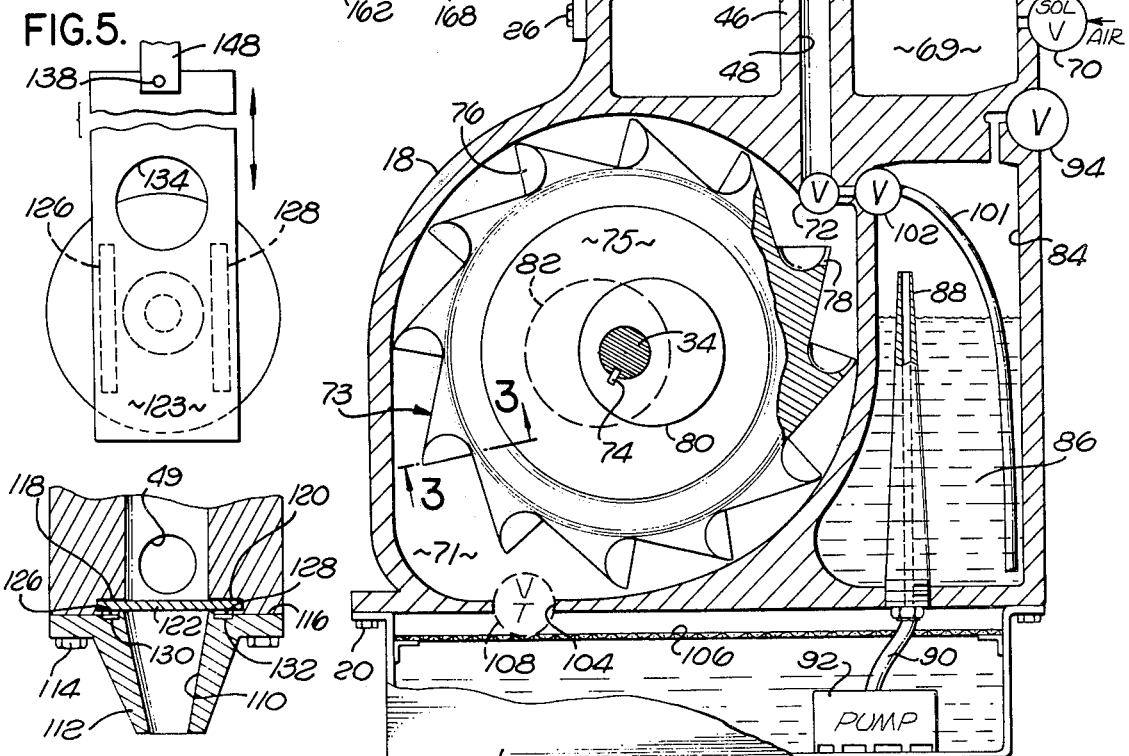
FIG.5.
FIG.4.

PISTON ENGINE EMPLOYING OXYGEN

This is a division of application Ser. No. 408,368, filed Oct. 23, 1973, now U.S. Pat. No. 3,905,339.

FIELD OF THE INVENTION

The fields of art to which the invention pertains include the field of internal combustion engine, free piston engines, motion conversion systems therefor, and hydraulic motors.

BACKGROUND AND SUMMARY OF THE INVENTION

Internal combustion engines of usual design employ mechanical crankshafts to convert piston reciprocation to rotational motion for the drive shaft. Such mechanically linked engine systems have inherent a number of performance and carburetion drawbacks which result in operational inefficiency, high construction and high maintenance and operation costs.

One such drawback is the criticality of ignition timing and, related thereto, minimum fuel octane requirements. As a result of direct and inflexible mechanical crankshaft linkages, faulty timing or the use of fuel of insufficient octane rating can result in destructive preignition or knocking. Another result is the requirement for complicated and expensive gear mechanisms for automatic transmissions.

Still another drawback is limitation of the types of carburetion systems which can be used. Exhaust pollutants such as oxides of nitrogen could be eliminated or substantially reduced if oxygen, or a blend of oxygen and air, were usable as a fuel component rather than air (of which 78% is nitrogen). However, use of oxygen in a standard internal combustion engine would present inordinate detoration-preignition, vibration problems and danger of oxygen concentration in the crankcase chamber making the motor unsafe. Indeed, a "spongy" power thrust is necessary for standard engines, and made possible by nitrogen dilution. Other disadvantages stem from the fact that the combination of carburetion and crankshaft mechanism requires a compression stroke so that the engine draws in fuel and fires even when power is not being applied to the drive shaft. As one result, the engine uses fuel at all speeds, even when coasting, and when idling. At high speeds, e.g. 50 mph and higher, excessive vacuum developed by the engine sucks in considerable fuel even when the engine is not being throttled. As another result, an expensive, battery-consuming starting motor is needed to provide initial compression.

The present invention provides a piston engine with motion conversion and carburetion features that eliminate the foregoing drawbacks. The engine employs a flywheel rotor, in lieu of a crankshaft, driven hydraulically by the piston with no direct coupling to the piston. Combustion or starting of the motor is obtained by spark-ignition of injected fossil type fuel, preferably along with oxygen or oxygen-air blend, controlled by a variable D.C. motor.

Specifically, one end of a plunger is connected to the piston, the other end being slidably disposed in an hydraulic cylinder. During a combustion stroke, the piston-driven plunger displaces hydraulic fluid in the cylinder through a high speed orifice to impinge against spaced cavity surfaces formed along the periphery of the rotor, thereby spinning the rotor. A slide valve is disposed at the head of the high speed orifice and is hydraulically connected to the cylinder. By such means, pressure changes in the cylinder reciprocate the slide valve to provide momentary delay, during pressure build-up, and then release of the cylinder fluid, thereby increasing the fluid velocity and imparting greater kinetic energy. Hydraulic fluid is recirculated during an exhaust stroke wherein the piston is returned by injected air pressure. Air used to return the piston acts as a coolant and also flushes to exhaust any stray oxygen that might accumulate below the piston.

A fuel injection system is used and ignition is timed so as to fire when the piston reaches top dead center. However, timing is not critical nor is octane rating of the fuel; gasoline, diesel fuel or jet fuel can be used by slight adjustments. Since the piston is not coupled directly to the flywheel rotor, the only affect of preignition is to lose power. There is no post-ignition. As a result of using lower air pressure forces only to return the piston to a combustion mode, very low octane fuels can be used. Since slippage of the flywheel is possible at low speeds, only a gear box with forward, backward and lock positions is required. Thus, complex automatic transmission mechanisms can be eliminated.

The absence of pre-ignition problems also makes possible the use of oxygen to replace part or all of the air, enabling the elimination or substantial reduction of oxides of nitrogen and enabling a greater conversion of carbon monoxide to carbon dioxide. Furthermore, closer control over fuel usage and combustion is possible, decreasing the amount of unburned hydrocarbons in the exhaust. Fuel efficiency by use of low cost oxygen or oxygen-air blend, readily available, is greater than with the present inefficient internal combustion type motors.

By using an ignition system coupled to a D.C. motor-driven fuel supply, power is applied, independently of drive shaft rotation, by operation of a rheostat (which can be connected to a conventional foot pedal). Accordingly, fuel is applied only under driver control, irrespective of the speed of the vehicle enabling substantial fuel economy. Since the engine need not be "turned over" to operate, a starting motor is not needed.

Still another advantage of the present engine is the ability to produce additional braking power at high speeds, as will be described hereinafter. Other advantages and features of the invention will be apparent from the following description.

BRIEF DESCRIPTION OF THE DRAWINGS

FIG. 1 is a perspective view of a two cylinder engine employing the present invention;

FIG. 2 is a cross-sectional view, partly broken away, partly schematic, of one cylinder of the engine and associated equipment;

FIG. 3 is a cross-sectional view of the rim of a flywheel rotor utilized in the present engine, taken on line 3—3 of FIG. 2;

FIG. 4 is a cross-sectional view of a high speed orifice and slide valve component utilized herein;

FIG. 5 is a top plan view of a portion of the slide valve of FIG. 4; and

FIG. 6 is a cross-sectional view of an hydraulic cylinder component of the slide valve of FIG. 5.

DETAILED DESCRIPTION

Referring to FIG. 1, a simple two-cylinder engine 10 is shown, utilizing the concepts of the present invention, and includes a pair of air cooled cylinders 12 and 14 bolted, as at 16, to a flywheel rotor housing 18, of heavy construction, which, in turn, is bolted (as at 20 in FIG. 2) to an oil supply tank or pan 22. A bracket 24 is bolted (as at 26 in FIG. 2) to the top of the rotor housing 18 and extends therefrom to support a control box 28 in which fuel and ignition controls are mounted on the bracket, as will be described hereinafter. Ignition cables 30 and fuel supply lines 32 and 33 extend from the control box 38 and connect to the cylinders 12 and 14 as hereinafter described. A drive shaft 34 on which the flywheel rotors are mounted and supported by bearings on both ends, extends through the rotor housing 18 on both ends.

Although the engine is illustrated in FIG. 1 with two cylinders, any number of cylinders can be arranged adjacent one another, in line or radially displaced as desired. Separate flywheel rotors with separate rotor housings, as will be described, can be used for multiple cylinders, coupled together in a common drive shaft, or a single elongate rotor can be used. In the following figures a single cylinder will be described, other cylinders being identically constructed. Further, while the invention is described as using oxygen, blends of oxygen and air could also be used. Air under pressure can also be used but is not desirable.

Referring to FIG. 2, a piston 36 is slideably disposed in the air cooled cylinder 12 (or water cooling can be used). An elongate plunger 38, in the form of a rod, is disposed in an opening 42 through the bottom of the piston 36 and is secured to the piston 36 by a locking pin 44. The free end of the plunger 38 extends about 4 inches (generally 2 to 10 inches) from the bottom of the piston 36. An upright cylindrical member 46 extends from the rotor housing 18 and is formed with an elongate cylindrical opening 48 to serve as a hydraulic cylinder for the free end of the plunger 38. With the piston 36 at a "top dead center" position within the air cooled cylinder 12, a combustion chamber 50 is defined by the top surface of the piston 36 and the top inner surface of the air cooled cylinder 12.

The wall 47 of the air cooled cylinder 12 defines a pair of oppositely disposed exhaust ports 52 and 53, spaced so as to be closed by the piston 36 during the combustion mode, but exposed following downward travel of the piston 36. A pair of exhaust bleeds 54 and 55 are formed through the cylinder wall 47 into the combustion chamber 50 (at points just below the top of the piston 36 when at "top dead center") from the exhaust ports to permit the piston 36 to return to "top dead center" following a combustion-exhaust cycle. Air escape ports 56 and 57 are also defined by the cylinder wall 47, spaced downwardly from the exhaust ports 52 and 53 and exposed when the piston 36 is in its top position. The air escape ports are connected via conduits 58 and 59 to exhaust conduits 60 and 61, respectively, which, in turn connect the exhaust ports 52 and 53 to an exhaust system (not shown), i.e., the usual tail pipe and muffler. Air injected into the cylinder 12 to return the piston 36, as hereinafter described, travels through the conduits 58 and 59 to aid in cooling the motor, flushing possible stray oxygen and can be used in completing combustion of exhaust gases. The exhaust bleeds 54 and 55 are formed by machining notches in the cylinder head 12' and by drilling holes through the cylinder wall 47 to the exhaust ports 52 and 53. Thereafter, the cylinder head is secured in place by bolts, such as at 62, threaded into openings formed through the walls of the cylinder head and cylinder wall 47.

A spark plug 63 is carried in a threaded spark plug opening 64 defined through the cylinder head 12'. Fuel and oxygen injection nozzles 65 and 66, respectively, are threadably disposed in respective openings 67 and 68 formed through the cylinder head 12' on opposite sides of the spark plug opening 64.

The top of the rotor housing 18 is formed so as to define a back-pressure chamber 69 wider than the piston cylinder 12 cavity and in open communication therewith. Air is injectable into the back-pressure chamber 69 through a solenoid valve 70, as will be referred to hereinafter.

The rotor housing 18 defines a rotor compartment 71 which communicates with the hydraulic cylinder opening 48 through a high speed orifice and slide valve assembly 72 as will be described hereafter in more detail. A flywheel rotor 73 is rotatably disposed within the rotor compartment 71 axially supported on the drive shaft 34 and secured thereon by a key 74.

Referring additionally to FIG. 3, the rotor 73 includes a heavy, flat plate-like central portion 75 which narrows radially outwardly to form a plurality of tangentially directed, scooped, cup-like members 76 uniformly spaced around the periphery of the rotor. The rotor 73 is positioned so that as it rotates (clockwise in FIG. 2), the cavity surfaces of successive cup-like members 76 are aligned with the high speed orifice and slide valve assembly 72. The outer lip of each cup-like member can be notched through to provide centrifugal discharge slots 78 to assure emptying of the cups during rotation.

When sufficient clearance is not possible between the flywheel rotor and housing, opposite surfaces of the central rotor portion 75 can be machined, as shown, to form oppositely offset, shallow annular protrusions 80 and 82 (in shadow). The protrusions 80 and 82 aid in preventing oil friction build-up between the rotor 73 and the housing 18 by causing hydraulic fluid to be thrown back against the inner surface of the housing 18.

The housing 18 also defines a reservoir 84 which contains a recyclable supply of hydraulic fluid 86, such as compression oil or any oil used for high pressure hydraulic motion. The reservoir 84 is supplied with recycled fluid 86 through a fill tube 88 jutting through the floor of the reservoir 84 and connected by tubing 90 to a pump 92. The fill tube 88 is tapered, the top end thereof being machined with sharp edges to assist in the removal of air entrapment as oil flows thereover. The top end of the fill tube 88 is spaced below the top of the reservoir 84 but above a predetermined level for the fluid 86 so that any air bubbles will remain on top of the fluid 86. Excess air can exit through a valve 94 which is connected to exhaust (not shown).

The pump 92 is located in the oil pan 22 and delivers fluid therefrom to the fill tube 88. The pump 92 has a built-in bypass set to maintain a modest pressure (5–30 psi) on the fluid reservoir and assures instant feed of fluid through tubing 101 and a check valve 102 to the hydraulic cylinder 48, via an opening 49 therein (FIG. 4), during return of the piston 36.

Fluid in the rotor chamber 71 drains into the pan 22 by force of gravity through an opening 104 formed through the bottom of the rotor housing 18 and then through a screen 106 for removal of air or foreign objects that might foul valves, etc. One wall of the pan 22 defines filter vents (not shown) for air thus separated.

If it is desired to use the flywheel rotor 70 for high speed braking, a non-failing valve 108 (shown in shadow) can be inserted in the rotor housing opening 104 and coupled (by mechanism not shown) to the brake pedal so as to be operative only during high speed driving. Closing of the valve 108 will place the engine in a hold position since the hydraulic fluid cannot escape from the heavily constructed rotor housing 18. The valve 108 can include a high pressure relief (not shown) to prevent locking.

During combustion, fluid in the hydraulic cylinder 43 is driven by the plunger 38 through the high speed orifice and slide valve assembly 72 which is shown in detail in FIGS. 4, 5 and 6. Referring to FIGS. 4 and 5, the high speed orifice 110 is defined through a downwardly tapering nozzle 112 having an inlet:outlet hold diameter ratio of about 4:1 so as to increase the velocity of hydraulic oil discharge. Other ratios, e.g. from 1:1 to 8:1 can be used. The nozzle 112 is bolted, as at 114 to the bottom surface 116 of the hydraulic cylinder wall. A pair of shoulders 118 and 120 are machined through the inner cylinder wall surface 116 to define a rectangular space between the cylinder wall and the top surface of the nozzle 112. A slide valve 112 is disposed through the rectangular space and is retained by a pair of flat springs 126 and 128 disposed in grooves 130 and 132 formed through the confronting top surface of the nozzle.

The slide valve 122 is formed as a solid flat member having a solid forward extent 123 and defining an opening 134 at its rear end. An actuator 136 (FIG. 6) is connected to the rear of the slide valve 122, at 138, and reciprocates the slide valve in accordance with pressure in the hydraulic cylinder 48. Prior to combustion, and during the initial stages thereof and initial downward thrust of the plunger 38, the slide valve 122 is disposed so that its solid extent overlies the nozzle 112 inlet, blocking passage of hydraulic oil from the hydraulic cylinder 48. The result is a momentary build-up of pressure in the hydraulic cylinder 48 imparting increased kinetic energy to the hydraulic oil in the cylinder 48. Within a fraction of a second following combustion, the actuator 136 thrusts the slide valve 122 forward to align its opening 134 with the high speed orifice 110, releasing the hydraulic oil in a burst, similar to the release of a ballistic when firing a gun.

Referring to FIG. 6, the actuator 136 includes a housing 138 defining a piston chamber 140 wherein a piston 142 is slidably disposed. The forward end of the activator piston carries an elongate rod 144 which extends through a forward opening 146 in the activator housing 138 and terminates in a flat member 148 connected to the slide valve at 138 (FIG. 5). A coil spring 149, disposed around the rod 144 between the piston 142 and forward wall of the housing 138, loads the piston 142 to a rearward position. The rear end of the housing 138 is open and is threadably fitted and sealed, by an O-ring 150, to a pressure cap 152. The cap 152 defines a pressure chamber 154 open to the piston chamber 140 and defines an opening 156 into the chamber. Pressure conduit (not shown) connects the cap opening 156 directly to the hydraulic cylinder 48, at the opening 49 (FIG. 4).

Following combustion and pressure build-up in the hydraulic cylinder 48, a small amount of hydraulic fluid is forced through the hydraulic cylinder opening 49 (FIG. 4) and into the actuator pressure chamber 154. The fluid pushes the actuator piston 142 forward, moving the slide valve to its open position and releasing fluid from the hydraulic cylinder. Thereafter, the actuator piston 142 is returned by the spring 149.

As a result of the interconnection between the actuator 136 and the hydraulic cylinder 48, the actuator 136 reciprocates the slide valve 122 in correspondence, but slightly out of phase, with reciprocation of the engine piston 36. During combustion, the initial explosion and expanding gases therefrom force the engine piston 36 downwardly at speeds of 2,000 to 3,500 feet per minute. By retaining the hydraulic cylinder oil a fraction of a second, and then discharging it through the reduced diameter high pressure orifice 110, the hydraulic oil bursts forth at a velocity of about 6,000 to 10,000 feet per minute, striking the flywheel rotor cups 76 with great force and energy.

Referring again to FIG. 2, to return the engine piston 36 to "top dead center", air from an air pump (not shown) is injected at about 5–20 psi into the back-pressure chamber 69 by means of a solenoid valve 70, actuated as described hereinafter. The injected air also serves to cool the engine and to flush any remaining fuel and oxygen into the exhaust system, assisting in the further combustion of exhaust gases. The air returning the piston can initially pass through a standard air-oil lubricator (not shown) between the solenoid and air pump so as to carry lubricating oil to the engine piston.

A pressure relief valve 160 is connected to the back-pressure chamber 69 and is adjusted to minimize resistance to the downstroke of the engine piston 36.

Fuel and oxygen injection through solenoid valves (as will be described), spark ignition, and air injection through the solenoid valve 70, are all controlled by the same D.C. motor 162. The motor 162 is connected to a battery, maintained by a standard alternator driven by the shaft 34, and controlled by a rheostat connected to a foot pedal in the car (not shown). The spark plug 63 is ignited by a solid state ignition-timer 164 connected through a gear box 166 to the drive shaft 168 motor, adjusted so that ignition is timed with fuel and oxygen injection and distributed in accordance with the number of cylinders.

The oxygen injection nozzle 66 is connected via conduit (indicated by the line 32) to a solenoid valve 172 which controls oxygen flow from a pressure cylinder supply thereof (not shown). The fuel injection nozzle 65 is connected via conduit (indicated by the line 33) to a solenoid valve 176 which controls fuel under pressure from its storage tank (not shown). The oxygen supply solenoid valve 172, fuel supply solenoid valve 174 and air injection solenoid valve 70 are each operated by respective cams 178, 180 and 182 (via electrical switches not shown) disposed on the D.C. motor shaft 168 and adjustable for appropriate timing. Generally, the fuel and oxygen solenoid cams 178 and 180 are adjusted to simultaneously actuate the fuel and oxygen supply solenoid valves 172 and 176 at a predetermined interval prior to activation by the distributor-timer 164 of the spark plug 63. The air injection solenoid cam 182 is generally adjusted to be about 90°–180° from the other cams 178 and 180, depending upon length of piston stroke and combustion characteristics of the fuel. Speed of the engine is a direct function of speed of the D.C. motor 162.

In operation, upon actuating the D.C. motor 162, fuel and oxygen are fed through the nozzle 65 and 66 into the combustion chamber 50, followed by ignition of the spark plug 63. The resulting fuel combustion pushes the piston 36 and plunger 38 downwardly forcing hydraulic fluid in the hydraulic cylinder 48 against the closed slide valve 122. Pressure build-up in the hydraulic cylinder 48 causes the actuator 136 to open the slide valve 122 and the hydraulic fluid bursts forth from the high speed orifice 110 impinging against one or more flywheel rotor cups 76, turning the flywheel rotor 73 and drive shaft 34.

At this time, the D.C. motor shaft 168 has rotated sufficiently so that the air injection solenoid cam 182 actuates the solenoid valve 70 which injects air into the back-pressure chamber 69, forcing the piston 36 and plunger 38 upwardly. Upward movement of the plunger 38 draws hydraulic fluid 86 from the reservoir 84 via tubing 101 through the check valve 102 into the hydraulic cylinder 48, the pressure decrease in the hydraulic cylinder 48 having permitted the actuator spring 149 to return the slide valve to a closed position.

As the piston nears the bottom of its stroke, combustion products escape through exhaust ports 52 and 53 and on the upward stroke through exhaust bleeds 54 and 55, the injected air escaping through the air escape ports 56 and 57 as the piston reaches its top position.

It will be appreciated that the foregoing embodies particular means of accomplishing an effective result utilizing the principles and concepts of the present invention. Structural modifications and additions to particular components and relative positions thereof are possible. For example, the flywheel rotor 73 can be tapered or otherwise shaped to provide clearance as needed. Also, the high speed orifice and slide valve assembly 72 can be located at the bottom of the rotor 73 and horizontally directed thereto. The check valve 102 can then communicate with the oil pan 22, eliminating the reservoir 84 and pump 92. All such modifications and additions are intended to be covered by the foregoing illustrative embodiments, the invention being limited only be the claims appended hereto.

I claim:

1. In a piston engine having a piston carried in a cylinder therefor and defining therewith a combustion chamber, an improved combustion system comprising:
   means for injecting fuel into said combustion chamber;
   means for injecting a gas containing oxygen in greater than atmospheric proportion into said combustion chamber;
   means for spark-igniting said injected fuel and gas;
   a variable speed electric motor; and
   means responsive in predetermined sequence to rotation of said electric motor to effect said fuel and gas injections, and said spark ignition.
2. The piston engine of claim 1 including means for flushing any stray gas from said cylinder rearwardly of said piston and wherein said responsive means is additionally responsive in said predetermined sequence to effect said flushing means.

* * * * *

UNITED STATES PATENT AND TRADEMARK OFFICE
CERTIFICATE OF CORRECTION

PATENT NO. : 3,978,827
DATED : September 7, 1976
INVENTOR(S) : Marvin E. Wallis

It is certified that error appears in the above–identified patent and that said Letters Patent are hereby corrected as shown below:

Column 5, line 13, change "43" to --48--.

Column 8, line 10, change "be" to --by--.

Signed and Sealed this

Twenty-second Day of February 1977

[SEAL]

Attest:

RUTH C. MASON
Attesting Officer

C. MARSHALL DANN
Commissioner of Patents and Trademarks